United States Patent
Kim (10) Patent No.: US 7,990,645 B2
(45) Date of Patent: Aug. 2, 2011

(54) MAGNETIC RECORDING APPARATUS

(75) Inventor: Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 12/054,728

(22) Filed: Mar. 25, 2008

(65) Prior Publication Data

US 2009/0027802 A1    Jan. 29, 2009

(30) Foreign Application Priority Data

Jul. 24, 2007    (KR) ........................ 10-2007-0074121

(51) Int. Cl.
*G11B 5/09* (2006.01)

(52) U.S. Cl. ........... 360/48; 360/53; 360/75; 360/77.02; 360/77.08

(58) Field of Classification Search ........................ None
See application file for complete search history.

(56) References Cited

U.S. PATENT DOCUMENTS

| | | | | |
|---|---|---|---|---|
| 4,912,585 | A * | 3/1990 | Belser et al. ................... | 360/135 |
| 5,493,466 | A * | 2/1996 | Suyama .......................... | 360/317 |
| 6,421,195 | B1 * | 7/2002 | Rubin et al. ..................... | 360/48 |
| 6,456,449 | B1 * | 9/2002 | Belser et al. ................. | 360/77.01 |
| 7,251,101 | B2 * | 7/2007 | Soeno ....................... | 360/125.09 |
| 7,576,942 | B1 * | 8/2009 | Karns et al. ................. | 360/77.08 |
| 2002/0114101 | A1 * | 8/2002 | Guzik et al. ................ | 360/77.08 |
| 2003/0179481 | A1 * | 9/2003 | McNeil et al. .................. | 360/48 |
| 2004/0136113 | A1 * | 7/2004 | Soeno ......................... | 360/97.01 |
| 2005/0068650 | A1 * | 3/2005 | Annampedu et al. ........... | 360/39 |
| 2005/0073771 | A1 * | 4/2005 | Shimomura et al. ............ | 360/75 |
| 2005/0219730 | A1 | 10/2005 | Sakurai et al. | |
| 2006/0093863 | A1 * | 5/2006 | Tsuchiya et al. .............. | 428/827 |
| 2006/0139814 | A1 * | 6/2006 | Wachenschwanz et al. .. | 360/317 |
| 2006/0279871 | A1 * | 12/2006 | Albrecht et al. ................ | 360/75 |

FOREIGN PATENT DOCUMENTS

JP    2005-276352 A    10/2005

* cited by examiner

*Primary Examiner* — Dismery E Mercedes
(74) *Attorney, Agent, or Firm* — Sughrue Mion, PLLC (57) ABSTRACT

Provided is a magnetic recording apparatus including a magnetic recording medium having a magnetic recording position patterned of a magnetic substance and a read head reading information from the magnetic recording medium, wherein the magnetic recording medium includes: a data area having the magnetic recording position patterned including a plurality of data tracks; and a servo area including a servo burst for tracking the data tracks, wherein the servo burst includes a plurality of bursts deviating from one another in a downtrack direction, and a width of each of the bursts is equal to or greater than a width of the read head and narrower than twice the width of the read head. According to this structure, although data is reproduced using a read head having a greater width than a width of each of data tracks, a linear section in which an output voltage is reduced depending on a size of an off-track is formed. As a result, a dead zone can be removed.

12 Claims, 11 Drawing Sheets

MAGNETIC RECORDING APPARATUS

CROSS-REFERENCE TO RELATED PATENT APPLICATION

This application claims priority from Korean Patent Application No. 10-2007-0074121, filed on Jul. 24, 2007 in the Korean Intellectual Property Office, the disclosure of which is incorporated herein in its entirety by reference.

BACKGROUND OF THE INVENTION

1. Field of the Invention

The present invention relates to a magnetic recording apparatus, and more particularly, to a magnetic recording apparatus including a magnetic recording medium having a burst pattern appropriate for a patterned position in which data is recorded, for example, a discrete track medium or a patterned medium.

2. Description of the Related Art

Presently, information storage apparatuses are required to record and/or reproduce data at a high density even with an abrupt increase in an amount of processed information. In particular, magnetic recording apparatuses using magnetic recording media have a large capacity and high access characteristics and thus, are mainly used as information storage apparatuses for computers and various digital devices. However, if a size of a bit, as a minimum recording unit, or a pitch of a data track is reduced to a range equal to or less than a limit of a magnetic recording medium having a continuous recording layer (hereinafter referred to as a "continuous medium"), noise becomes a significant issue and recording stability is abruptly lowered due to an effect of a neighboring area. Thus, there is a limitation in increasing linear recording density (BPI) in a downtrack direction or track density (TPI) in a crosstrack direction to increase recording density.

Therefore, research is being conducted on discrete track media or patterned media having magnetic recording layers with magnetic recording positions pre-patterned in manufacturing steps. Such discrete track media have structures in which annular data tracks are pre-patterned, and the patterned media have structures in which minimum recording units, i.e., bits, are patterned as island shapes. Here, separation areas among the patterned data tracks or around patterned unit bits are emptied or filled with a non-magnetic material. In the case of such a discrete track medium or a patterned medium, track density can be increased to record data at a high density. As the track density increases, the width of a read head is reduced, thus it is difficult to manufacture the read head and the sensitivity of the read head is lowered. As a result, a voltage of an output signal is lowered and thus results in white noise. Therefore, a signal-to-noise ratio (SNR) is lowered.

In order to complement this, a head having a structure in which a width of a read head is greater than a width of a data track is suggested. Since a magnetic field is not generated in a separation area of a medium, although the width of the read head is greater than that of a patterned track, noise is not generated from the medium. Also, even if the read head deviates from the data track, since the width of the read head is still greater than that of the data track, output is not lowered and an off-track performance is improved. However, if the width of the read head is greater than that of the data track and an off-track is within a range equal to or less than a predetermined degree, a dead zone, in which a servo signal does not vary, is formed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a magnetic recording apparatus for optimizing a burst pattern in consideration of the width of a read head in order to solve a dead zone problem of a servo signal, as occurring in a discrete track medium or a patterned medium, generated from a magnetic recording medium on which data is recorded in only a predetermined position even when the width of the read head is greater than that of a data track of the magnetic recording medium.

According to an aspect of the present invention, there is provided a magnetic recording apparatus including a magnetic recording medium having a magnetic recording position patterned of a magnetic substance and a read head reading information from the magnetic recording medium, wherein the magnetic recording medium includes: a data area having the magnetic recording position including a plurality of data tracks; and a servo area including a servo burst for tracking the data tracks, wherein the servo burst includes a plurality of bursts deviating from one another in a downtrack direction, and a width of each of the bursts is equal to or greater than a width of the read head and narrower than twice the width of the read head.

The width of the read head may be greater than a width of each of the data tracks.

The servo area may further include a correction area in which correction information is recorded to indicate a deviation degree of the servo burst from central lines of the data tracks. Thus, although a pitch of the servo burst is not equal to a pitch of each of the data tracks, the data tracks can be correctly tracked using the servo burst.

Accordingly, the magnetic recording apparatus of the present invention can correctly track servo without forming a dead zone even when the read head having the greater width than that of each of the data tracks.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted.

Figure 1:
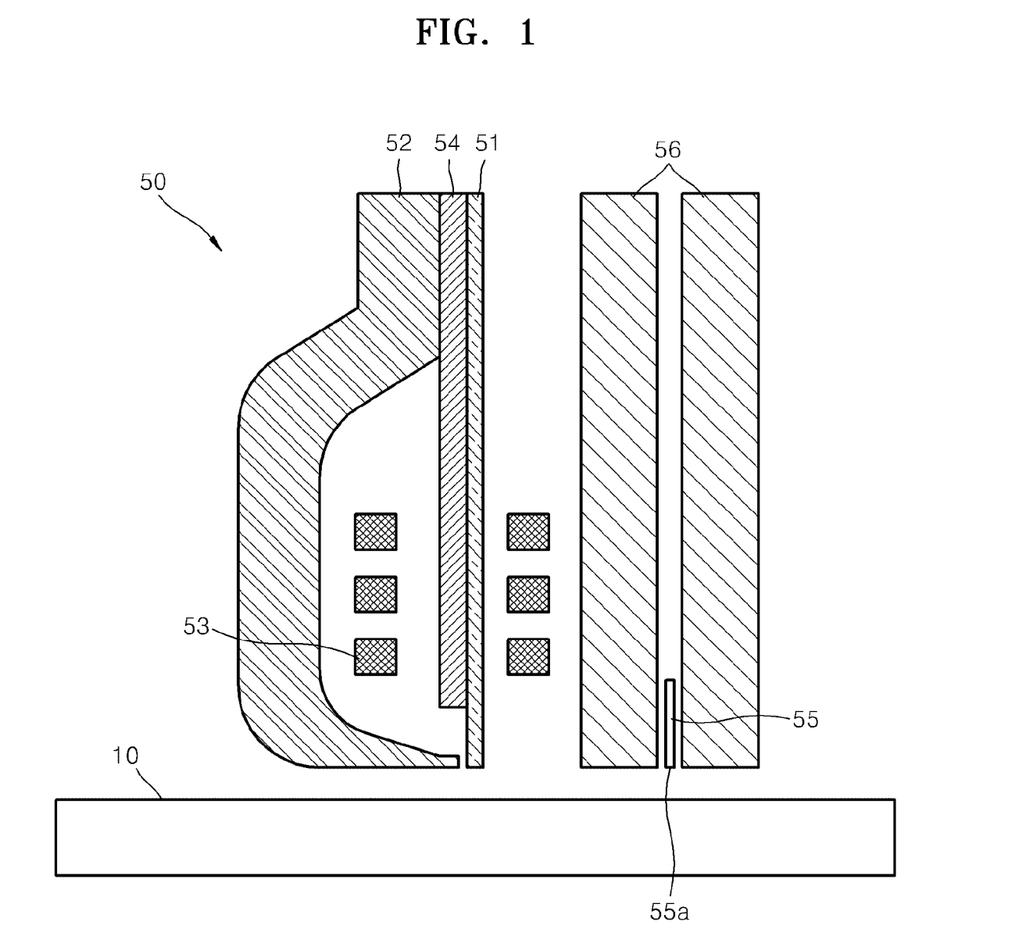
FIG. 1 schematically illustrates a magnetic recording apparatus according to an exemplary embodiment of the present invention.
Figure 2:
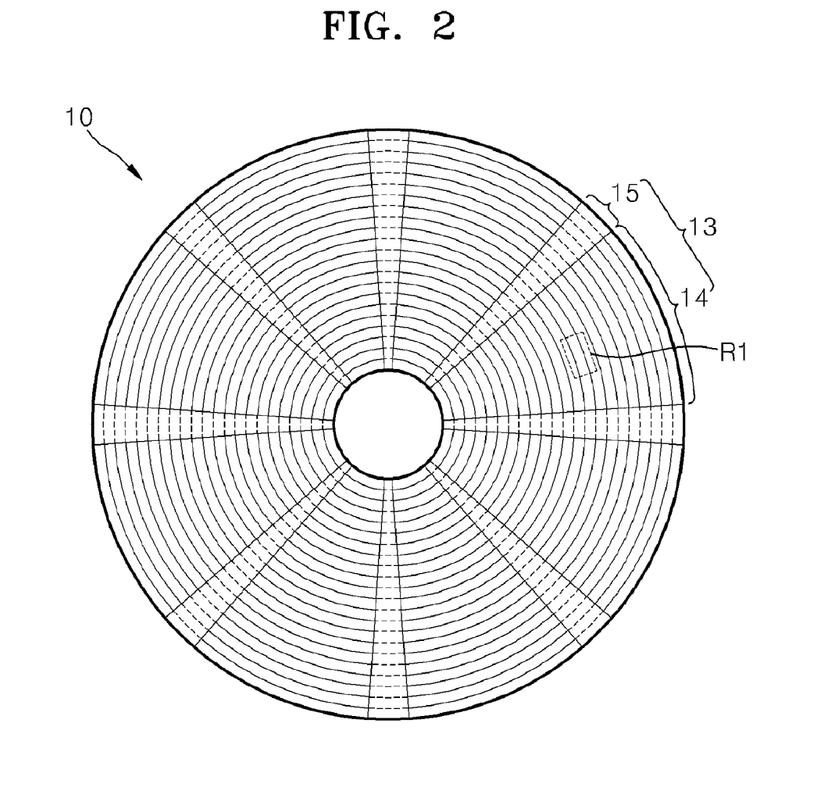
FIG. 2 schematically illustrates a magnetic recording medium of FIG. 1.
Figure 3:
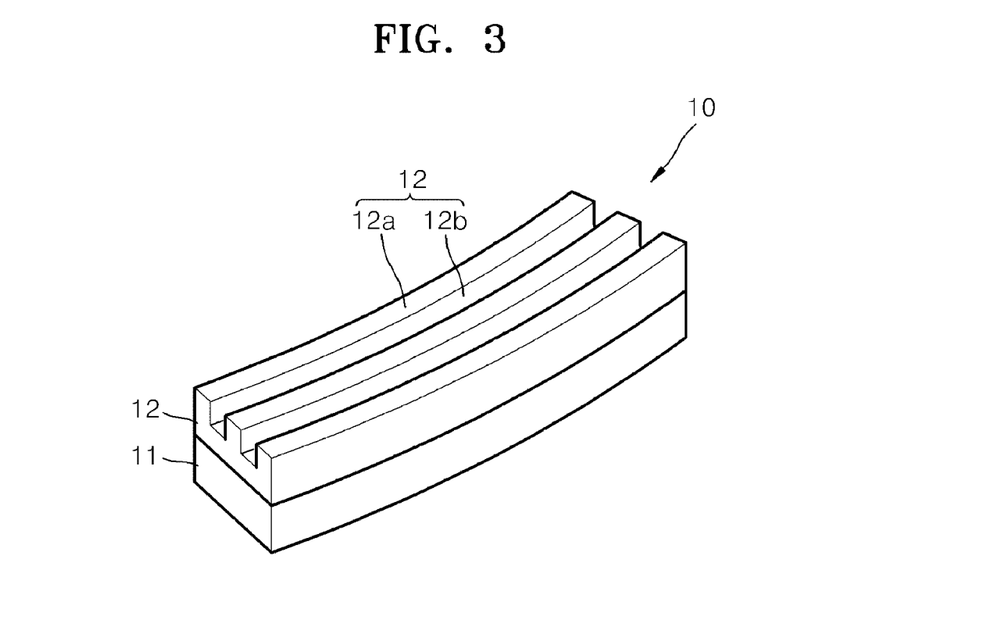
FIG. 3 is a perspective view of portion R1 of FIG. 2.

FIG. 1 schematically illustrates a structure of a magnetic recording apparatus according to an exemplary embodiment of the present invention, and FIGS. 2 and 3 illustrate a magnetic recording medium used in the magnetic recording apparatus of FIG. 1.

Referring to FIG. 1, the magnetic recording apparatus of the present exemplary embodiment includes a magnetic recording medium 10 and a head 50 that records and/or reproduces information on and/or from the magnetic recording medium 10.

Referring to FIGS. 2 and 3, the magnetic recording medium 10 includes a magnetic recording layer 12 formed on at least a surface of a substrate 11 having a disc shape. Here, as shown in FIG. 2, the magnetic recording layer 12 is patterned with protrusions 12a that protrude as magnetic substances and grooves 12b that magnetically isolate the protrusions 12a from one another. Thus, the magnetic recording layer 12 has a magnetic recording position that is pre-determined in a manufacturing step. The protrusions 12a may be data tracks 16 of FIG. 4 or burst patterns 18 of FIG. 8 as described later. The grooves 12b may be separation areas 17 of FIG. 4 that separate the data tracks 16 or the burst patterns 18 from one another and may be emptied or filled with a non-magnetic material.

The magnetic recording surface of the magnetic recording medium 10 may be divided into a plurality of sectors 13 at the same intervals with respect to a center of the magnetic recording medium 10. Each of the sectors 13 includes a data area 14 and a servo area 15. The data area 14 includes data tracks 16 which are formed of a protruding magnetic substance and in which user data is magnetically recorded and separation areas 17 which magnetically isolate the data tracks 16 from one another. The data tracks 16 are formed of continuous magnetic substances in an annular downtrack direction so as to be magnetically isolated from one another in a diameter direction of the substrate 11 and may each have a width from several of nm to tens of nm. As described above, the magnetic recording medium 10 of the present exemplary embodiment is a discrete track medium in which the data tracks 16 are patterned to minimize magnetic effects among the data tracks 16 so as to increase recording density.

Servo information necessary for recording and/or reproducing data on and/or from the magnetic recording medium 10 using a magnetic head is recorded in the servo area 15. Servo information includes a servo burst that is used by a magnetic head to correctly track data tracks on a magnetic recording medium. The servo information may be patterned together with the data tracks 16 of the data area 14 in a step of manufacturing the magnetic recording medium 10.

Referring to FIG. 1 again, the head 50 includes a recording head including a main pole 51, a return yoke 52, and a coil 53 and a read head 55. The recording head may further include a sub yoke 54 that assists magnetic flux in condensing at an end of the main pole 51 positioned toward the magnetic recording medium 10. The main pole 51, the return yoke 52, and the sub yoke 54 may be formed of a magnetic material such as NiFe. The read head 55 is disposed between magnetic shielding layers 56 to be shielded from magnetic noise generated around the read head 55. The read head 55 may be a magneto-resistive element such as a giant magneto-resistive (GMR) element, a tunneling magneto-resistance (TMR) element, or the like. An air bearing surface of the head 50 maintains a distance of several nm to tens nm from the magnetic recording medium 10 to record and/or read information, such that the air bearing surface of the head 50 includes an end 55a of the read head 50, which is positioned toward the magnetic recording medium 10.

Figure 5:
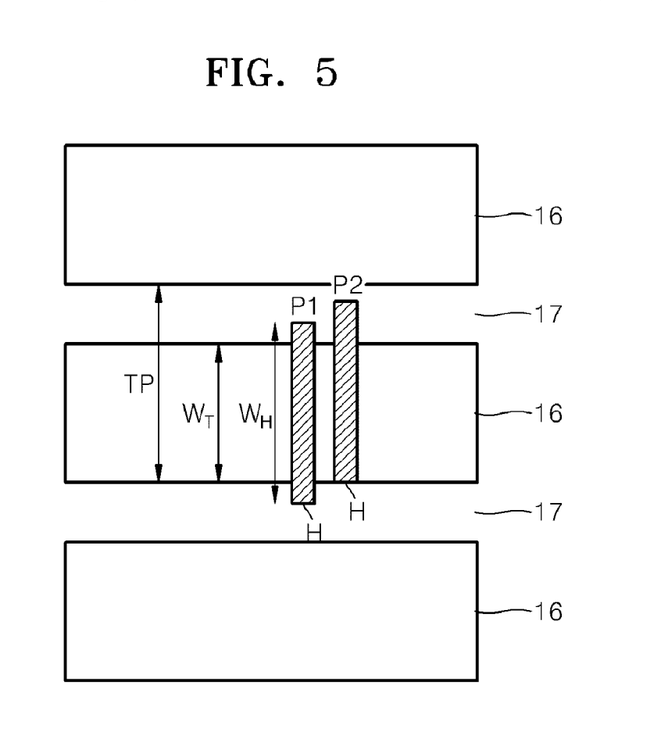
FIG. 5 illustrates a comparison example of a general burst pattern formed in a servo area of a magnetic recording medium.

If data is read using the read head 55 of FIG. 1 having a greater width than that of the data track 16, a relationship between the width of the read head 55 and the width and a pitch of the data track 16 occurs as illustrated in FIG. 5. In FIG. 5, TP denotes pitches of the data tracks 16, WT denotes a width of each of the data tracks 16, and WH denotes the width of a surface H of the read head 55 of FIG. 1 facing the magnetic recording medium 10. Referring to FIG. 5, the data tracks 16 of the magnetic recording medium 10 of the present exemplary embodiment in which magnetic recording is performed are patterned in a manufacturing step. The widths WT of the data tracks 16 are as narrow as possible to increase recording density. However, if the widths WT of the data tracks 16 are as narrow as possible as described above, a very weak signal is detected even when information is magnetically recorded in the data tracks 16. The surface H of the read head 55 facing the magnetic recording medium 10 has a bar shape crossing the data tracks 16, and the width WH of the surface H may be greater than the width WT of each of the data tracks 16. Even if the width WH of the surface H of the read head 55 is greater than the width WT of each of the data tracks 16, and the surface H of the read head 55 does not overlap with the neighboring data track 16, the separation areas 17, forming borders between the data tracks 16, are non-magnetic areas. Thus, noise is not generated from a reproduced signal. Therefore, if the width WH of the surface H of the read head 55 detecting a signal is greater than the width WT of each of the data tracks 16, sensitivity of the read head 55 may be improved. If the width WH of the surface H of the read head 55 is greater than the width WT of each of the data tracks 16 as described above, and the read head 55 is slightly off-track, the read head 55 still overlaps over the data tracks 16. Thus, output signal is not lowered, and an off-track performance is improved.

Figure 6:
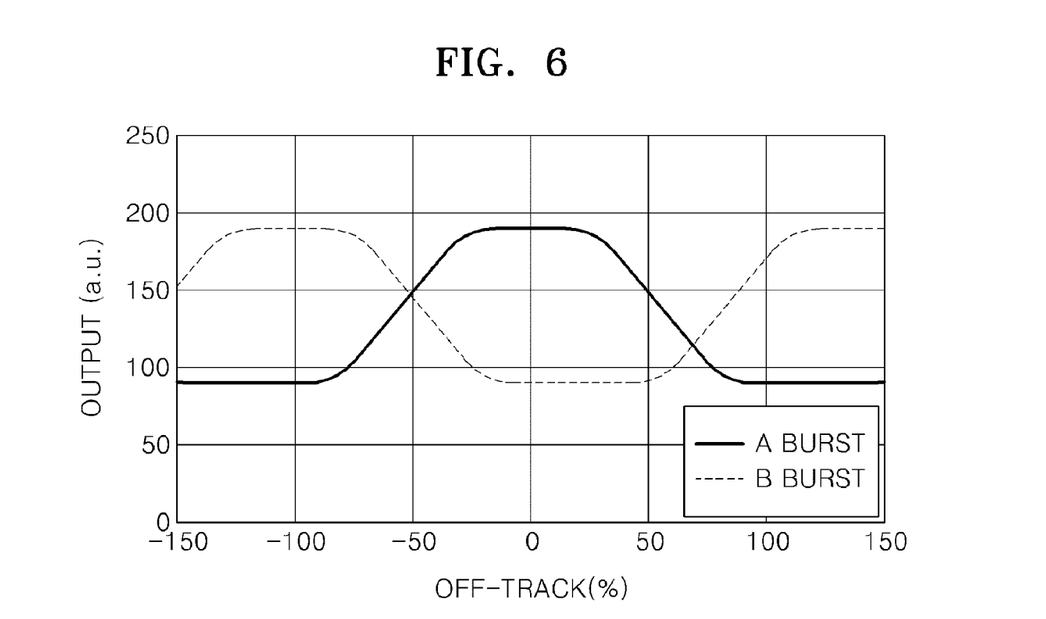
FIG. 6 is a graph illustrating problems that may occur when the burst pattern of FIG. 5 is read using a read head having a greater width than that of a data track.

However, the present inventor has discovered that if a servo burst having a general pattern is formed in a servo area of a discrete track medium, a dead zone is formed. FIGS. 5 and 6 illustrate a comparison example for explaining such a dead zone.

Referring to FIG. 5, a servo burst, as the comparison example, includes a burst A formed along central lines CL of the data tracks 16 and a burst B formed along central lines (not shown) of the separation areas 17. Thus, widths of the bursts A and B that are in a crosstrack direction, i.e., in a diameter direction of a disc, are uniform, and a sum of the widths of the bursts A and B approximately corresponds to the pitches TP of the data tracks 16 of FIG. 5.

Figure 4:
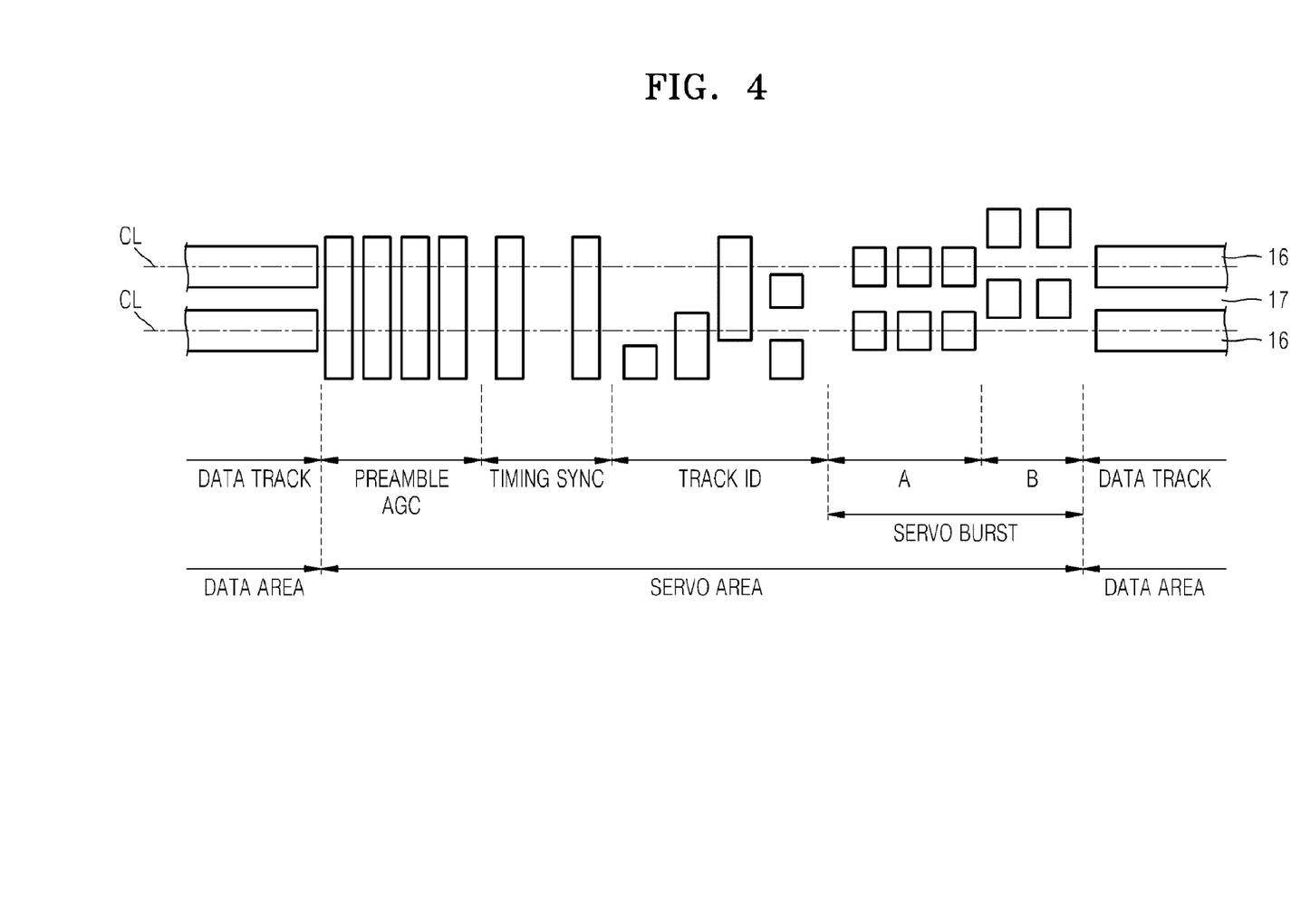
FIG. 4 illustrates a relationship between the width of a read head and the width and a pitch of a data track.

FIG. 6 illustrates output waveforms of the bursts A and B varying according to off-track (%) when the servo burst illustrated in FIG. 5 is reproduced. Referring to FIG. 6, if data is read using the read head 55 having the greater width WH than the width WT of the data tracks 16 as illustrated in FIG. 4, constant portions appear on output waveforms of the bursts A and B. The even portions indicate that when the surface H of the read head 55 facing the magnetic recording medium 10 is in a correct position P1 or an off-track position P2, as illustrated in FIG. 5, an intensity of a reproduction signal is uniform. Thus, even portions of burst signal waveforms are dead zones of off-tracks. Such a dead zone indicates that a servo burst does not provide a correct signal for tracking.

A servo burst of the present exemplary embodiment appropriate for performing reproduction using a read head having a greater width than that of each data track will now be described.

Figure 7:
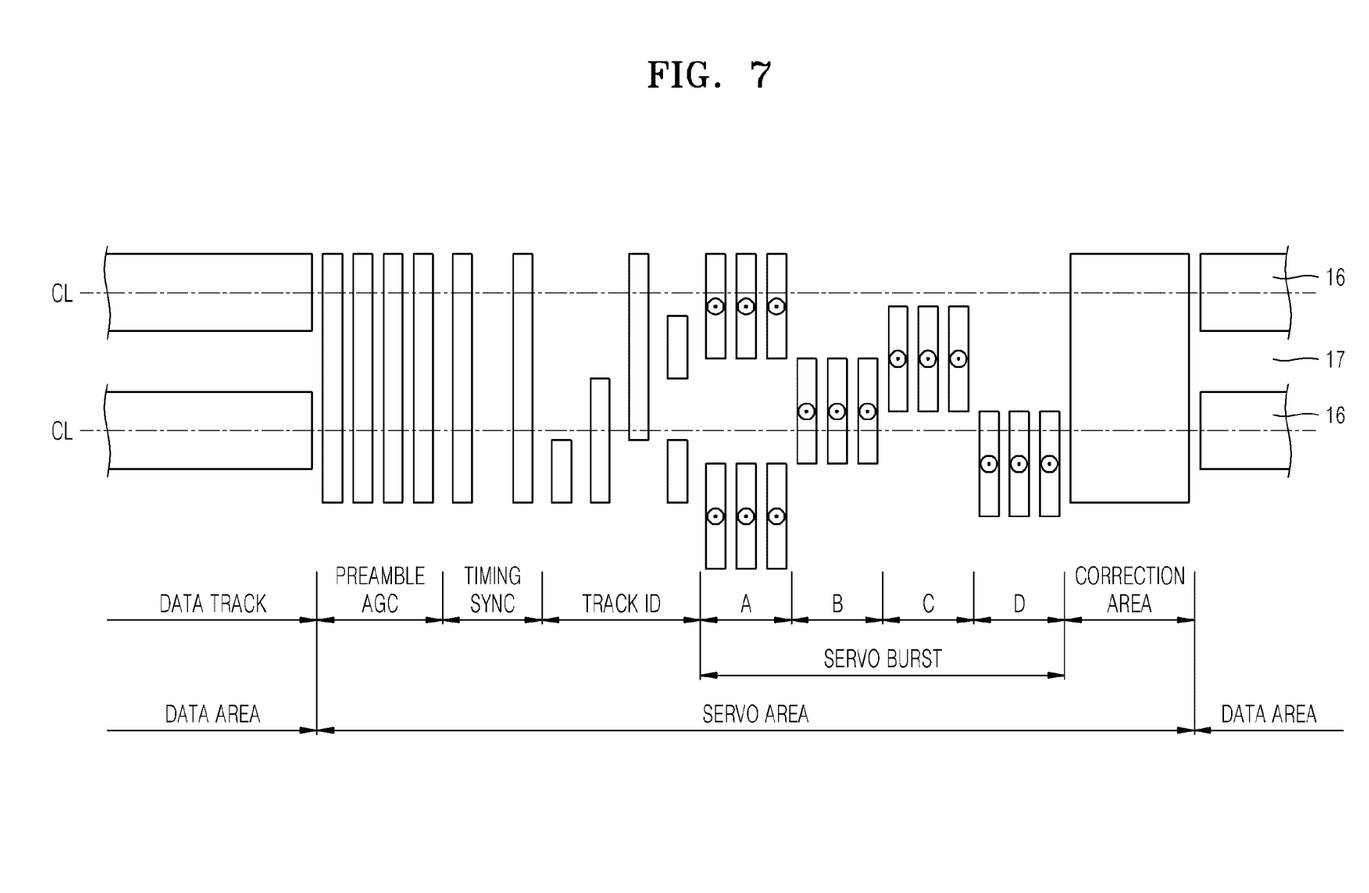
FIG. 7 schematically illustrates burst patterns formed in a servo area of the magnetic recording medium of FIG. 1.
Figure 8:
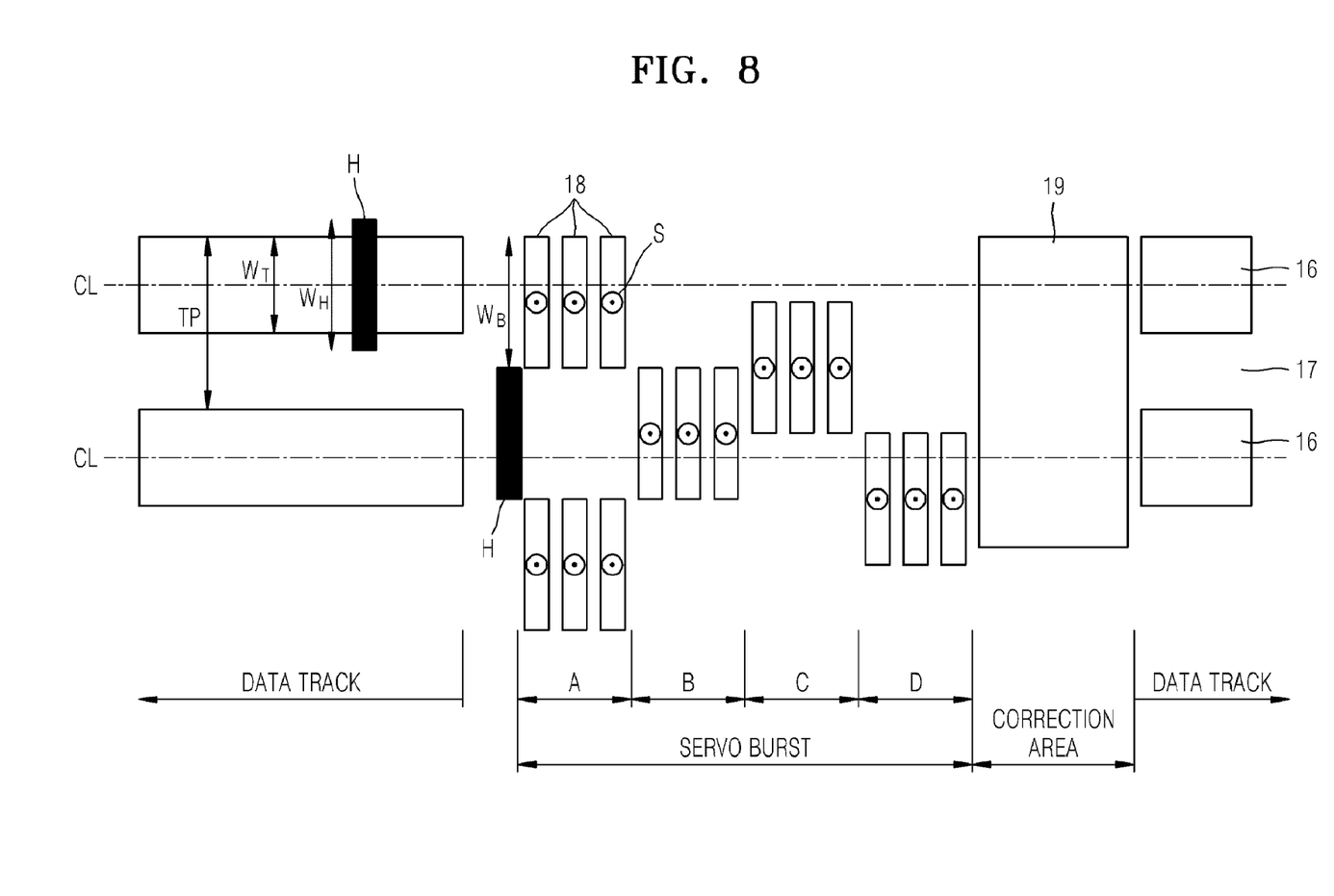
FIG. 8 is an enlarged view of a servo burst area of FIG. 7.

FIG. 7 schematically illustrates a burst pattern used for the magnetic recording medium 10 of FIG. 1. FIG. 8 is an enlarged view of a servo burst area of FIG. 7, i.e., omitting other types of servo information except for a servo burst to easily compare the servo burst with data tracks.

Referring to FIGS. 7 and 8, a magnetic recording surface of a magnetic recording medium of the present exemplary embodiment is divided into a data area and a servo area. The data area includes the data tracks 16 and the separation areas 17 that magnetically separate the data tracks 16 from one another.

Pre-burst information and a servo burst are recorded in the servo area. The pre-burst information may include at least one of preamble auto gain control (AGC), a timing sync, and a track identification (ID). The preamble AGC is provided to form a gap in front of a servo sector and control uniform timing margin and gain at a gap so as to determine a gain. The timing sync signifies starting of the servo sector, and the track ID provides track information. Pre-servo information may include one-time rotation information, sector information, etc. of a disc.

The servo burst of the present exemplary embodiment is patterned and embedded together with the data tracks 16 in the manufacturing step for the magnetic recording medium. Referring to FIG. 8, the servo burst includes a plurality of bursts which are disarranged and each of which includes burst patterns 18. The burst patterns 18 are direct current (DC)-magnetized so as so as to advance signals S in an up direction as shown in FIG. 8. Thus, the burst patterns 18 are discretely arranged and DC-magnetized and thus have burst signals similar to those of alternating current (AC)-magnetized burst pieces of a conventional continuous medium. In the present exemplary embodiment, for convenience of explanation, it is described that the burst A includes three burst pieces. However, the present invention is not limited thereto, and thus, in the present invention, a burst may include less than or more than three burst pieces.

In the present exemplary embodiment, although the surface H of the read head 55 of FIG. 1 having the width WH greater than the width WT of each of the data tracks 16 is used, a width WB of a burst may be approximately equal to the width WH of the surface H of the read head 55 so that a dead zone is not formed unlike in the comparison example. Thus, the magnetic recording apparatus of the present exemplary embodiment is particularly appropriate when the width WH of the surface H of the read head 55 facing the magnetic recording medium 10 is greater than the width WT of each of the data tracks 16 of the magnetic recording medium 10.

The burst pattern will now be described. The servo burst includes at least one of the bursts A and B. The bursts A and B do not overlap with each other when viewed from a crosstrack direction, and a border of the burst A in the crosstrack direction coincides with a border of the burst B in the crosstrack direction. In other words, the burst B is offset from the burst A by the width WB of the burst in the crosstrack direction. Therefore, distances among bursts A, which are discretely arranged in the crosstrack direction, each correspond to the width WB of the burst. In other words, a pitch of the burst is twice the width WB of the burst.

Figure 11:
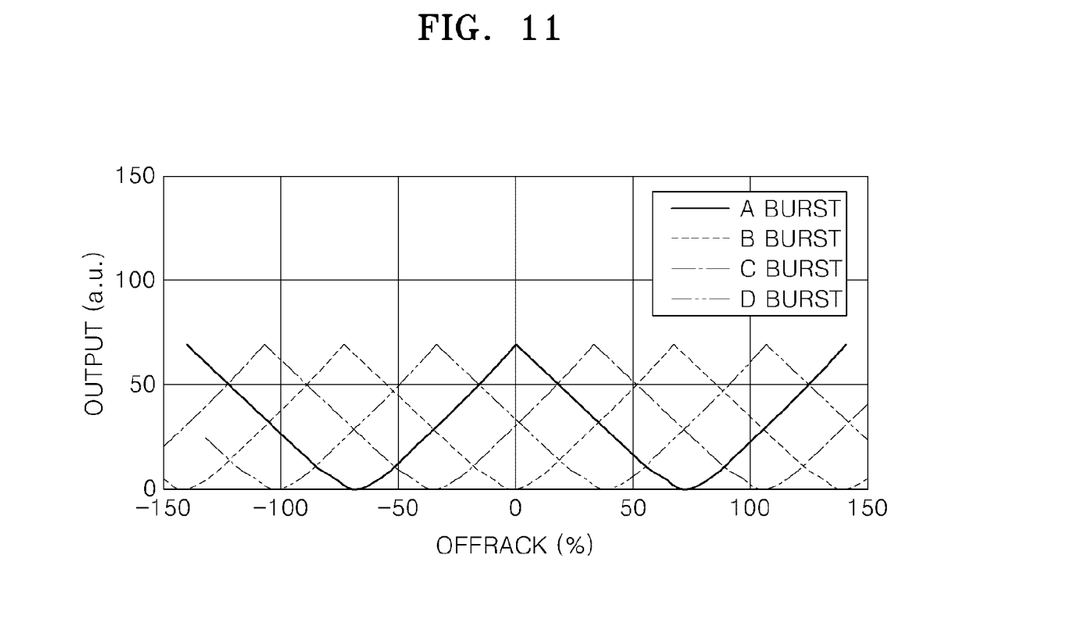
FIG. 11 schematically illustrates signal characteristics of a burst pattern of FIG. 7.

As shown in FIG. 11, when the width WB of the burst is equal to the width WH of the surface H of the read head 55, linearities of burst signals for the bursts A and B can be secured. Thus, a position of the read head 55 can be checked only using the bursts A and B. In addition, the servo burst may change a position of the burst B with respect to the burst A or may further include other bursts besides the bursts A and B.

As described above, in the present exemplary embodiment, the width WB of the burst is equal to the width WH of the surface H of the read head 55. However, the present invention is not limited thereto. The width WB of the burst can be greater than the width WH of the surface H of the read head 55 and narrower than twice the width WH of the surface H of the read head 55. Since the width WB of the burst is greater than the width WH of the surface H of the read head 55 in this case, a dead zone may appear in a signal for each burst. However, such a dead zone may be removed using a difference signal of the signals of the bursts A and B. Moreover, the servo burst may further include bursts C and D as shown in FIGS. 7 and 8 to secure linearity of a burst signal throughout an off-track of the read head 55. In the present exemplary embodiment, the burst C is offset from the burst A by half of the width WB of the burst in the crosstrack direction, and the burst D is offset from the burst C by the width WB of the burst in the crosstrack direction. The bursts C and D are repeatedly arranged at a distance of the width WB of the burst in the crosstrack direction. The technique for securing linearity using the difference signals among the bursts A, B, C, and D is well known to one of ordinary skill in the art, and thus its detailed description will be omitted.

The width WB of the burst according to the present exemplary embodiment is approximately equal to the width WH of the surface H of the read head 55. Since the width WH of the surface H of the read head 55 is greater than the width WT of each of the data tracks 16, the width WB of the burst is greater than the width WT of each of the data tracks 16. The surface H of the read head 55 facing the magnetic recording medium 10 must overlap with the neighboring data track 16. The width WH of the surface H of the read head 55 may be equal to or less than a pitch TP of a data track. In this case, the width WB of the burst is equal to or less than the pitch TP of the data track. Since the width WB of the burst is greater than the width WT of each of the data tracks 16, it is relatively easy to form a burst pattern. Thus, a mass-production process is possible, and productivity can be improved.

Figure 9:
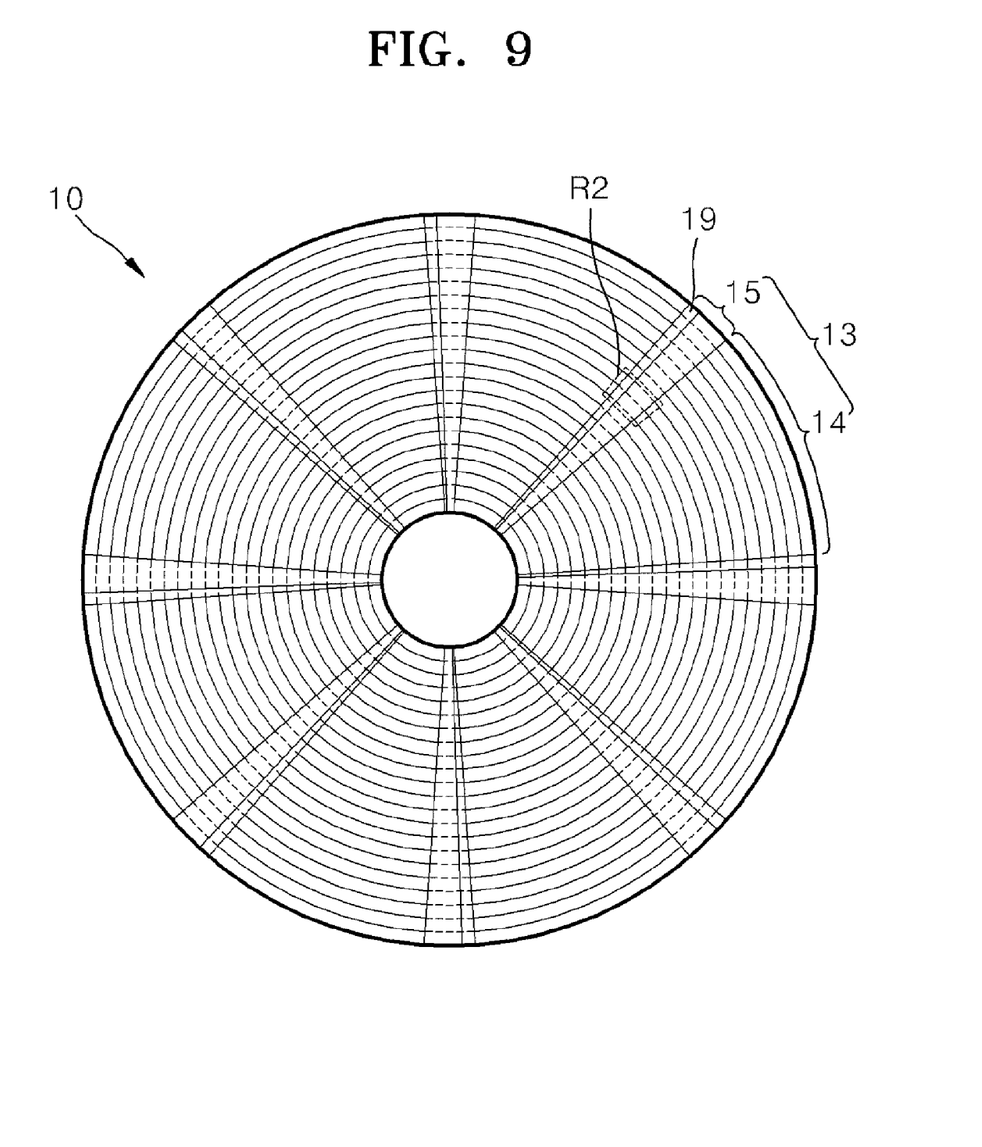
FIG. 9 schematically illustrates a modification of the magnetic recording medium of FIG. 2 including a servo area further including a correction area.
Figure 10:
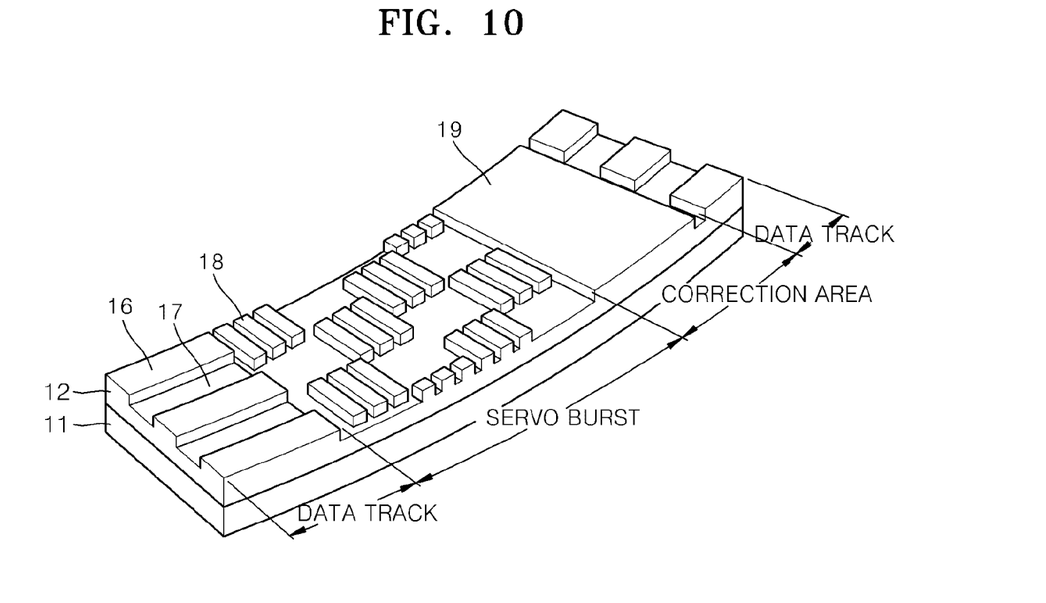
FIG. 10 is a perspective view of a portion R2 of FIG. 9.

FIG. 9 illustrates a modification of the magnetic recording medium 10 including a servo area further including a correction area 19, and FIG. 10 is a perspective view of a portion R2 of FIG. 9. In FIG. 10, other types of servo information are omitted, except for a servo burst, to easily compare the servo burst with the data tracks 16 as illustrated in FIG. 8.

Since the pitch of the burst corresponds to twice the width WB of the burst, the pitch of the burst may not coincide with the pitch of each of the data tracks 16. As a result, the bursts A, B, C, and D may slightly deviate from the data tracks 16. A central line of the burst A may not be arranged on the central lines CL of the data tracks 16. The burst pattern may deviate from the data tracks 16, and thus correction information may be provided to compensate for a deviation degree of each burst from the central lines CL of the data tracks 16. The correction area 19, in which the correction information is recorded, may be provided in the rear of a servo burst of a servo area 15. The correction area 19 may be a continuous area that is formed of continuous substances and is not patterned so that the correction information is recorded deviating from the data tracks 16.

A Runout Correction Code (RCC) may be further recorded in the correction area 19. In other words, the correction information may be recorded in an area in which the RCC is recorded. The RCC is information for correcting a regular tracking error occurring when a magnetic recording medium having a disc shape rotates. The regular tracking error occurs due to swaying caused by the deviation between a rotation center and a center of gravity of a disc, which is the magnetic recording medium, eccentricity between a central point and a rotation central point of a pre-patterned annular data track, etc. When the correction information and the RCC of the servo burst are recorded in the correction area 19, as described above, the read head 55 can correctly track the data tracks 16.

FIG. 11 illustrates a burst signal waveform of a burst pattern of the present exemplary embodiment. Referring to FIG. 11, since the width WB of the burst is approximately equal to the width WH of the surface H of the read head 55, dead zones do not appear in all sections of an output signal for the burst pattern of the present exemplary embodiment, and the output signal is linearized. Thus, signals of conventional bursts may be used instead of a difference signal of the conventional burst signals, i.e., a difference between bursts A and B. It has been described in the present exemplary embodiment that the servo burst includes the bursts A, B, C, and D, however, the present invention is not limited thereto. Hence, the servo burst may include bursts A and B or combinations of other types of bursts.

In the case of a discrete track medium, the burst pattern embedded in the discrete track medium is clearly magnetized. On the hand, in the case of continuous medium, when the continuous medium is magnetized, a border of each signal is slightly unclear as compared to the discrete track medium. If the burst pattern is formed in the discrete track medium of the present exemplary embodiment, an output signal is much clearer than in the continuous medium. Thus, the resolution of a burst signal can be improved. If a signal of an individual burst is used instead of a difference signal of bursts as previously described, a signal voltage output from the individual burst is weak. Thus, sensitivity may be reduced. However, a servo can be fully performed with the improvement of resolution of a burst signal of the discrete track medium. Furthermore, although a pitch of a burst is greater than a pitch of a data track, resolution of a burst signal is high. Thus, the servo can be fully performed.

Figure 12:
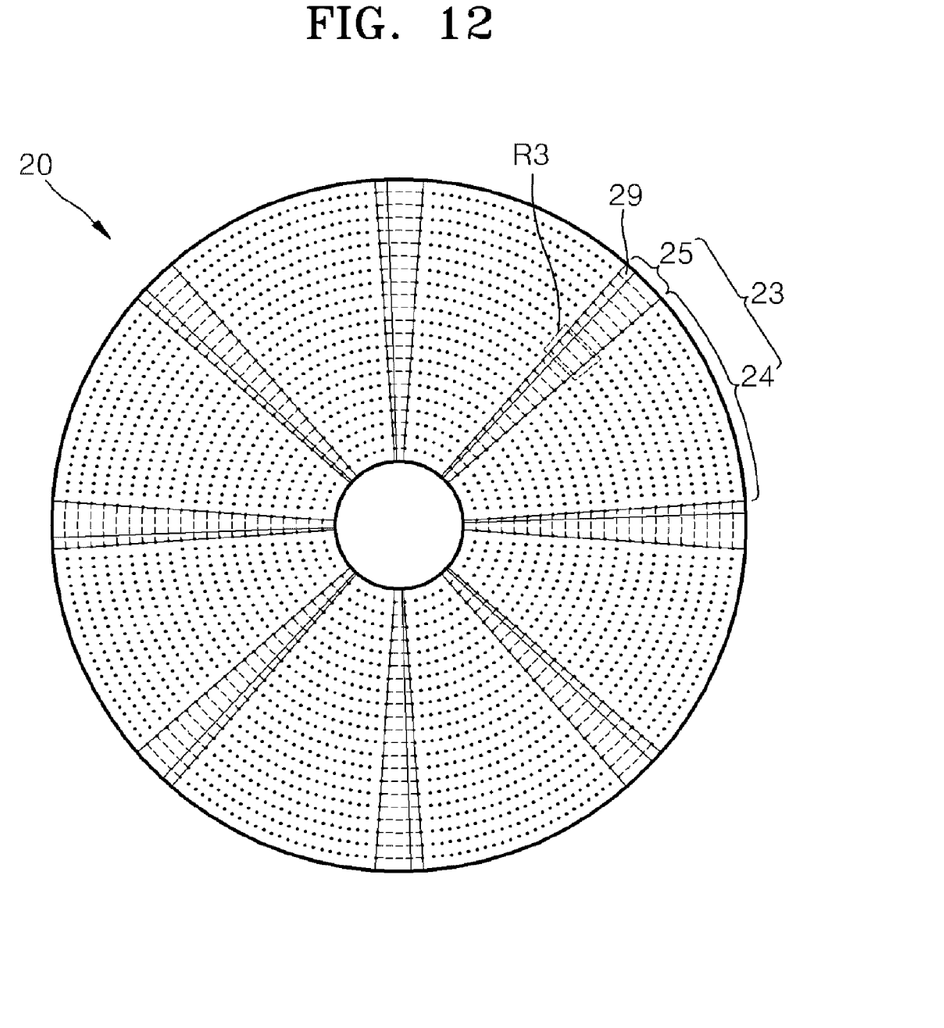
FIG. 12 schematically illustrates a magnetic recording surface of a magnetic recording medium according to another exemplary embodiment of the present invention.
Figure 13:
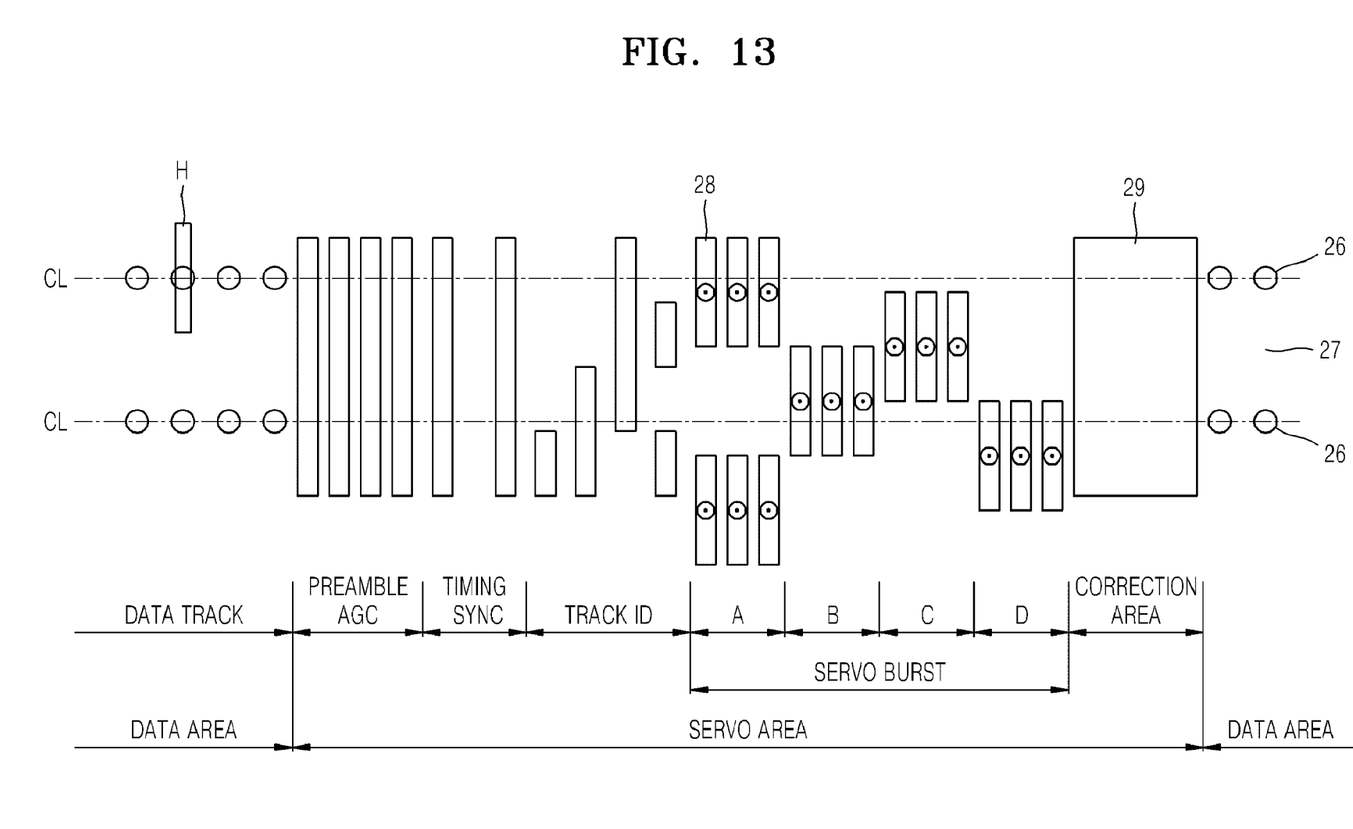
FIG. 13 is a perspective view of a portion R3 of FIG. 12.
Figure 14:
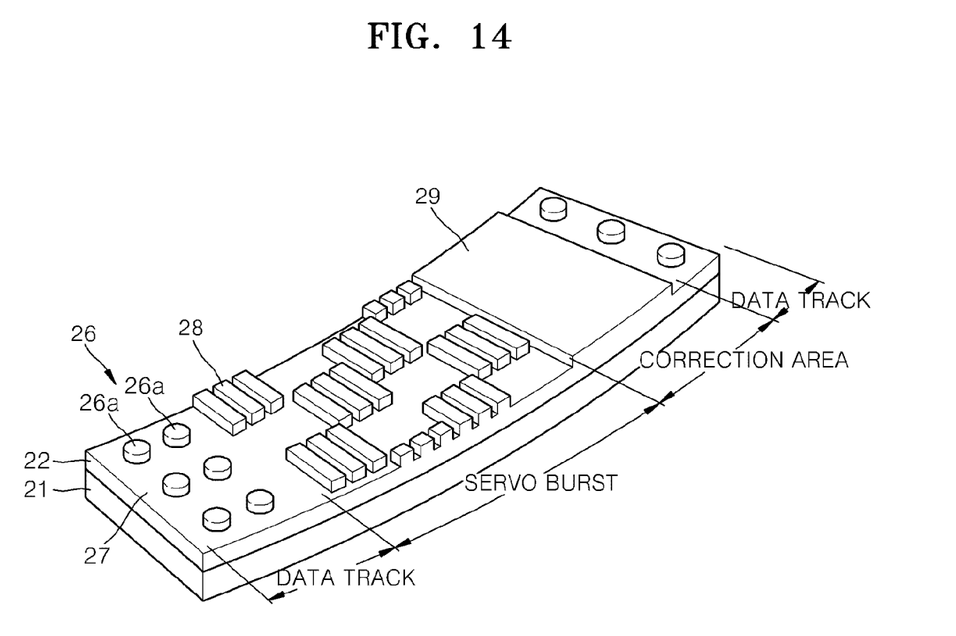
FIG. 14 schematically illustrates a burst pattern formed in a servo area of the magnetic recording medium of FIG. 12.

FIG. 12 schematically illustrates a magnetic recording surface of a magnetic recording medium 20, according to another exemplary embodiment of the present invention, and FIG. 13 schematically illustrates an example of a burst pattern formed in a servo area of the magnetic recording medium 20 of FIG. 12. FIG. 14 is a perspective view of a portion R3 of FIG. 12, such that other types of servo information are omitted, except for a servo burst and a correction area, to easily compare the servo burst with data tracks.

The magnetic recording medium 20 is substantially equal to the magnetic recording medium 10 of the previous exemplary embodiment except that it is a patterned medium which is formed through a patterning of a magnetic recording layer in the unit of minimum magnetic recording. Thus, its repeated descriptions will be omitted, and its differences will be described.

Referring to FIGS. 12 and 14, the magnetic recording medium 20 of the present exemplary embodiment includes a magnetic recording layer 22 which is formed on at least a surface of a substrate 21 having a disc shape. Here, the magnetic recording layer 22 is patterned with data tracks 26 and separation areas 27 in a manufacturing step. The data tracks 26 include protrusions 26a formed of a magnetic substance, and the separation areas 27 magnetically isolate the protrusions 26a from one another. The protrusions 26a are formed of discontinuous magnetic substances in a diameter direction of a disc and an annular downtrack direction of the disc, and the protrusions 26a may be bit dots which are patterned in the unit of minimum magnetic recording. The protrusions 26a may each have a diameter from tens nm to tens nm. The separation areas 27 may be emptied or filled with a non-magnetic material. As a result, the magnetic recording medium 20 of the present exemplary embodiment is a patterned medium in which the magnetic recording layer 22 is patterned in the unit of minimum magnetic recording to increase recording density.

A magnetic recording surface of the magnetic recording medium 20 is divided into a plurality of sectors 23 at the same intervals with respect to a center of the disc that is the magnetic recording medium 20. Each of the sectors 23 includes a data area 24 and a servo area 25. Referring to FIG. 14, pre-burst information and a servo burst are recorded in a servo area. The pre-burst information may include at least one of preamble AGC, a timing sync, and a track ID. The servo area 25 may further include a correction area 29 in which correction information for the servo burst is recorded. As shown in FIG. 15, the correction area 29 may be a continuous area which is formed of a continuous magnetic substance and is not patterned.

A section in which a servo burst is recorded is divided into four sub-sections in a downtrack direction, and each of the four sub-sections includes bursts A, B, C, and D. Bursts of the present exemplary embodiment are patterned and embedded together with the data tracks 26 in the manufacturing step and are substantially equal to the burst pattern described with reference to FIG. 8. In other words, each of the bursts A, B, C, and D includes burst pieces 28 and has a width approximately equal to the width WH of the surface H of the read head 55 of FIG. 1 facing the magnetic recoding medium 10. In the present exemplary embodiment, the width WB of the burst may be approximately equal to the width WH of the surface H of the read head 55 so that a dead zone is not formed even when the read head 55 having the width WH greater than the width WT of each of the data tracks 16 is used. Also, the burst pattern may deviate from the data tracks 26, and thus correction information may be recorded in the correction area 29 to compensate for deviation degrees of bursts from central lines CL of the data tracks 26. An RCC may be further recorded in the correction area 29. Since the correction information of the servo burst and the RCC are recorded in the correction area 29, the read head 55 can correctly track the data tracks 26.

Magnetic recording media according to the exemplary embodiments of the present invention have been described. The present invention is characterized in that a width of a burst is equal to a width of a read head or half of the width of the read head in order to remove a dead zone. Thus, various exemplary embodiments different from the above-described exemplary embodiments can be realized based on the spirit of the present invention and pertain to the scope of the present invention. As has been described in the above-described exemplary embodiments, a servo burst includes bursts A, B, C, and D, however, the present invention is not limited thereto, and thus, the servo burst may include bursts having various patterns to further simply process a signal. Patterns of various servo bursts used for a general continuous medium may be applied to a magnetic recording medium of the present invention.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A magnetic recording apparatus comprising:
a magnetic recording medium having a magnetic recording position patterned of a magnetic substance; and
a read head which reads information from the magnetic recording medium,
wherein the magnetic recording medium comprises:
a data area comprising a plurality of data tracks; and
a servo area comprising a servo burst for tracking the data tracks,
wherein the servo burst comprises a plurality of bursts which are offset from one another in a downtrack direction, and a width of each of the bursts is equal to or greater than a width of the read head and narrower than twice the width of the read head, and
wherein the width of the read head is greater than a width of each of the data tracks.

2. The magnetic recording apparatus of claim 1, wherein the servo area further comprises a correction area in which correction information is recorded to indicate an amount of deviation of the servo burst from central lines of the data tracks.

3. The magnetic recording apparatus of claim 2, wherein the correction area is a continuous area which is formed of a continuous magnetic substance and is not patterned.

4. The magnetic recording apparatus of claim 3, wherein a Runout Correction Code is further recorded in the correction area.

5. The magnetic recording apparatus of claim 1, wherein the servo area further comprises a pre-burst area in which pre-burst information is recorded.

6. The magnetic recording apparatus of claim 5, wherein the pre-burst information comprises at least one of a preamble, a timing sync, and a track identification.

7. The magnetic recording apparatus of claim 1, wherein the data tracks are magnetically isolated from one another in a diameter direction of a disc substrate and are formed of continuous magnetic substances in an annular downtrack direction.

8. The magnetic recording apparatus of claim 7, wherein separation areas magnetically isolate the data tracks from one another, and are emptied or filled with a non-magnetic material.

9. The magnetic recording apparatus of claim 1, wherein the data tracks are magnetically isolated from one another in a diameter direction of a disc substrate and are formed of discontinuous magnetic substances in an annular downtrack direction.

10. The magnetic recording apparatus of claim 9, wherein the discontinuous magnetic substances are bit units.

11. The magnetic recording apparatus of claim 9, wherein separation areas magnetically isolate the discontinuous magnetic substances from one another, and are emptied or filled with a non-magnetic material.

12. The magnetic recording apparatus of claim 1, wherein the width of the read head is less than a width of two of the data tracks.

* * * * *